June 2, 1953     E. F. KOUNOVSKY     2,640,494
REVERSE CYCLE VALVE
Filed Jan. 9, 1947     2 Sheets-Sheet 2
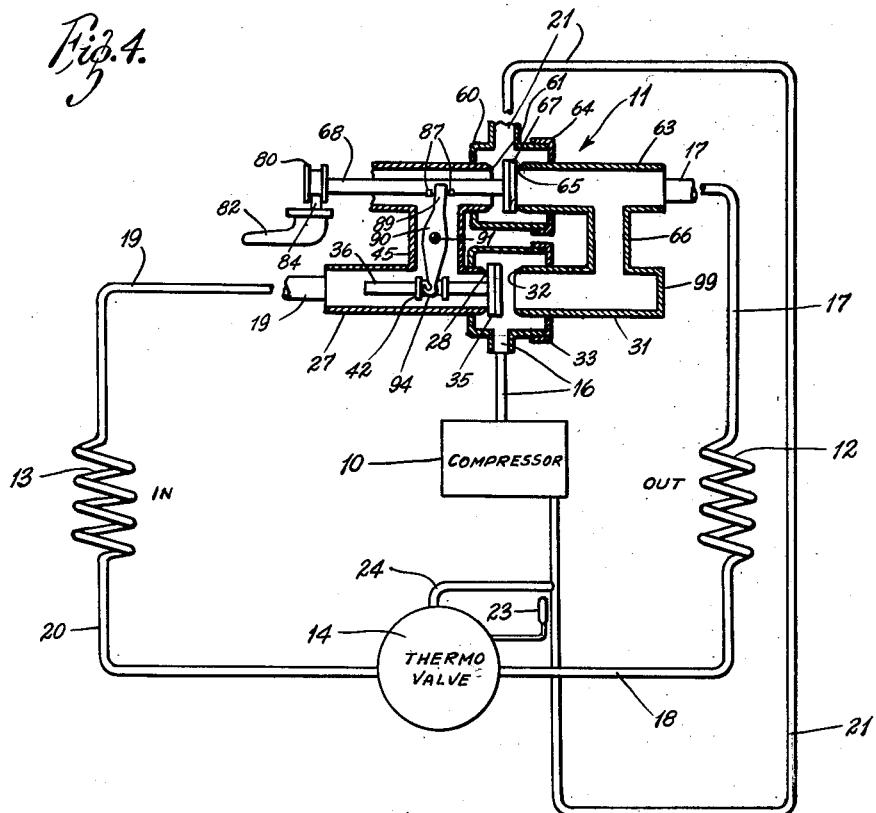
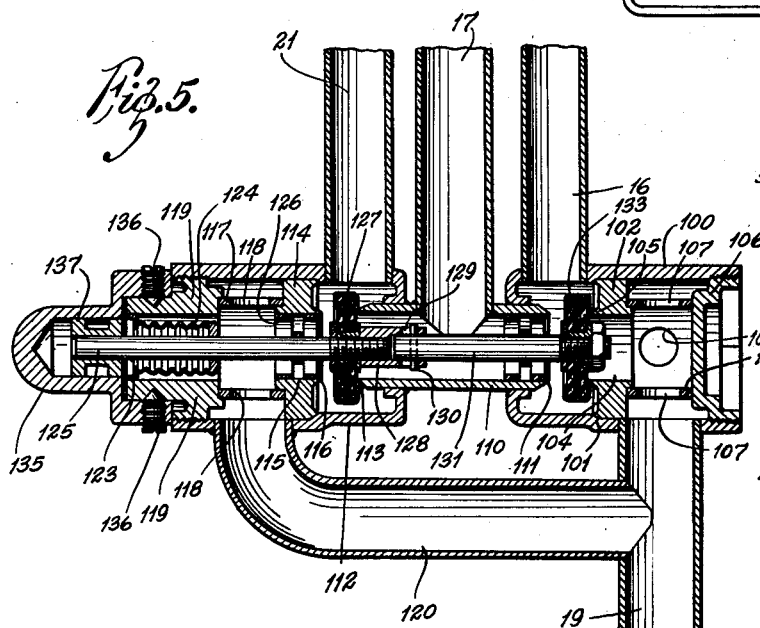
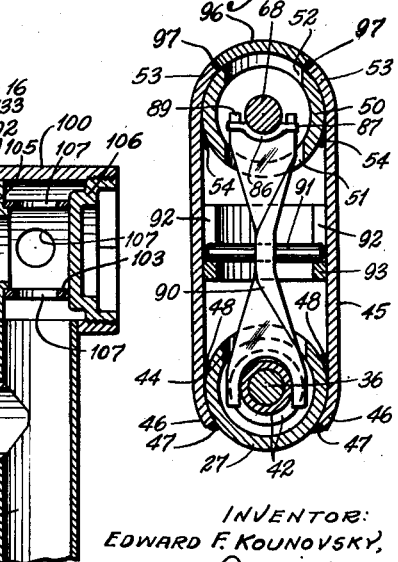
INVENTOR:
EDWARD F. KOUNOVSKY,
BY Kirkland, Rogers & Ezell
ATTORNEYS.

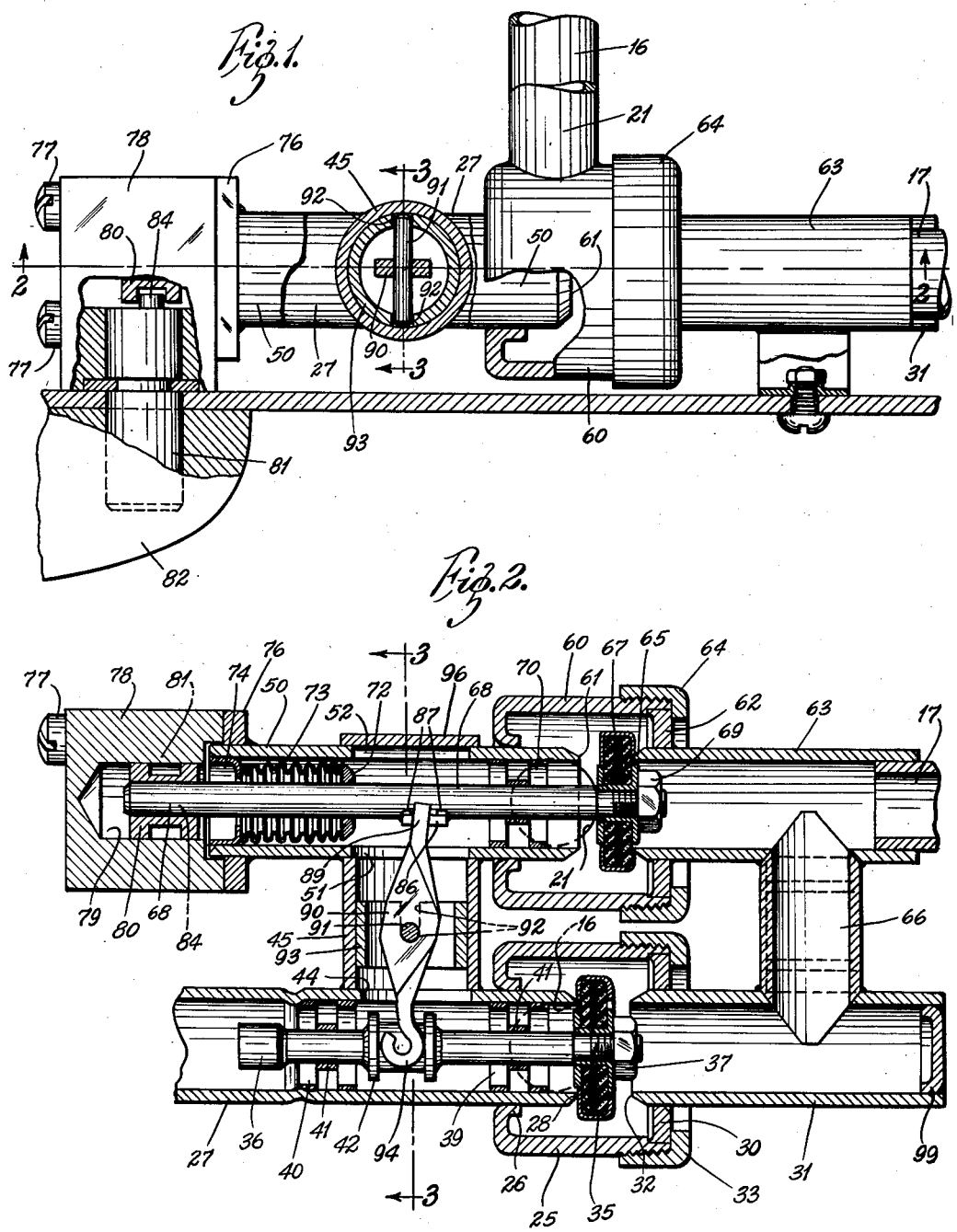

Patented June 2, 1953

2,640,494

UNITED STATES PATENT OFFICE 2,640,494

REVERSE CYCLE VALVE

Edward F. Kounovsky, St. Louis, Mo., assignor to Alco Valve Company, University City, Mo., a corporation of Missouri Application January 9, 1947, Serial No. 720,956

11 Claims. (Cl. 137—601)

The present invention relates to a reverse cycle valve. While this valve is capable of various uses, its particular application is in connection with reverse cycle refrigeration apparatus in which there are two coils, either one of which may be an evaporator, while the other is a condenser.

The broad object of the valve is to provide a satisfactory valve that may control which one of the two coils is the evaporator and which is the condenser, and which valve may reverse this order at will.

Another object is to provide a mechanism for interposition into a reverse type refrigeration system, or the like, wherein there is a high pressure inlet, a low pressure return, and selectable work lines, with a main control, preferably a valve shiftable to connect either of the work lines with the return, and with a valve selectively operable to connect the other work line to the inlet and to cut off the one from the inlet, with lost-motion connections between the main control and the inlet valve that insure movement of the inlet valve upon movement of the main control, but may merely move the inlet valve sufficiently toward its other seat to enable the flow pressure drops to complete its seating. This object includes that of eliminating the necessity of constructing a valve wherein the parts are made with that degree of accuracy required to insure joint seating of two valves under a single, positive, mechanical, force applying means. It further includes the objective of providing a second valve that will be mechanically forced to operate with the first control, but will not be mechanically operated throughout its complete cycle.

A further object is to provide a valve that will enable the compressor to start up under greatly reduced load, and that will insure application of the load when the compressor is up to speed.

Further objects of the invention include the provision of parts that may be easily assembled from stock materials so that the valve may be made at minimum cost. Further objects include the provision of particularly desirable interconnections between the two valve elements of the device.

Further objects will appear from the description to follow.

In the drawings, wherein the dispositions of the mechanism are for purpose of convenience in description:

Fig. 1 is a plan view of the mechanism partly broken away;

Fig. 2 is a vertical section on the line 2—2 of Fig. 1;

Fig. 3 is a vertical section on the line 3—3 of Fig. 2 and of Fig. 1;

Fig. 4 is a diagrammatic view of the refrigerating system with the valve shown therein; and Fig. 5 is a modified form of the invention.

This invention constitutes a variant upon the disclosure in application Serial No. 674,052 of June 3, 1946, now Patent No. 2,486,608, Nov. 1, 1949, by Franklin M. MacDougall, and assigned to the assignee hereof.

Referring particularly to Fig. 4 at the outset, a refrigeration system is shown having a compressor 10. This compressor is connected into the valve of the present invention, which is generally indicated at 11. There are two coils 12 and 13, and a thermal expansion valve 14.

The compressor 10 is connected by a high pressure line 16 into the valve 11. The valve 11 is connected by a work line 17 to the coil 12, and this coil is connected by a pipe 18 into one side of the thermal valve 14.

The valve 11 is connected by a work line 19 into the coil 13, and the coil 13, in turn, is connected by a pipe 20 into the other side of the thermal valve 14. A return low pressure line 21 connects from the valve 11 back into the compressor 10. The thermal expansion, or "thermo" valve 14, has a thermal bulb 23 disposed adjacent the return line 21, and an external equalizer line 24 connected into the return line 21. This is a conventional type of valve that maintains constant superheat in the expansion coils.

The valve 11 includes a first cup-shaped housing or chamber 25. The inlet line 16 opens into the interior of the chamber 25. This chamber may be formed from conventional tubular material. It has an inturned circular flange 26 at one end that receives the end of a tube or pipe 27, that constitutes one outlet from this chamber. This tube is tapered on its end to provide a valve seat 28. Solder, or the like, may be used to seal the tube 27 into the flange 26.

The other end of the cup 25 is open, but is grooved to receive a union head 30 which carries another pipe 31 to which it is permanently united. This pipe constitutes another outlet from the chamber 25, and has a valve seat 32 on its inner end. A union fitting 33 is threaded onto the exterior of the open end of the cup 25 and is designed to engage the disc 30 and fix the tube 31 into the cup 25.

A valve 35, that may be referred to as an inlet valve, is adapted to engage with either seat 28 or 32. This valve is mounted on a valve stem 36 to which it is removably secured by a nut 37 that engages over a threaded end on the stem 36. This stem is slidably guided in a pair of guides 39 and 40. These guides may be formed of cylindrical tubular parts having their center portions stamped inwardly at 41 to engage oppositely on the surface of the valve stem, as described in greater detail in the MacDougall application.

The valve stem 36 is provided with a collar arrangement 42 intermediate its ends for a purpose that will appear.

The tube 27 is provided with an upper circular opening 44, and is interfitted with the end of a cross pipe 45. The pipe 45 has an inside diameter approximately equal to the outside diameter of the pipe 27. A transverse cutout is made through the lower end of the pipe 45 from a center somewhat inward from the lower end of the pipe 45, as it appears in Fig. 2. The pipe 27 is fitted into this cutout, disposing the opening 44 to communicate into the connecting pipe 45, and the ends 46 of the cutout are swedged over and welded or soldered, as at 47, to join these two pipes permanently together. Additional soldering or welding may be applied at 48 to insure complete sealing.

The upper end of the pipe 45 is similarly cut out to receive a pipe 50, that is cut out to provide opposite openings 51 and 52. The pipe 50 is interfitted with the transverse cutout in the connecting pipe 45, so that the opening 51 establishes communication between them. The upper ends of the pipe 45, produced by the transverse cutout, are then swedged over as at 53 and the two pipes are soldered or welded together as at 54.

The pipe 50 interfits into the end of a housing or chamber 60 that is preferably identical with the cup 25. The pipe 50 has a valve seat 61 on its inner end. The cup 60 is grooved at its open end to receive a plate 62 that is welded to another pipe 63, and the plate 62, with the pipe 63, are removably secured to the cup by a union ring 64. The pipe 63 has a valve seat 65 on its inner end. A cross pipe 66 connects the pipes 31 and 63. The two pipes 50 and 63 constitute inlets to the upper valve housing 60.

A main control valve head 67 is attached to a valve stem 68 by a nut 69. This valve stem reciprocates within the pipe 50 and is provided with a support 70 similar to the supports 39 and 40. The outer end of the valve stem 68 receives a bellows head 72 that is soldered or otherwise secured to the valve stem 68. The bellows head has a bellows 73 thereon that is permanently attached to a cup 74 that is welded or otherwise secured inside the end of the pipe 50. This bellows seals off the end of the pipe 50, but permits reciprocation of the valve stem 68.

The pipe 50 is permanently attached to a cap plate 76 that is bolted at 77 to a handle block 78. This handle block has an internal bore 79 extending inwardly therefrom to receive the valve stem 68. Within this bore, the valve stem is soldered, welded or otherwise secured to a collar 80. This collar is adapted to be operated by a handle shaft 81 having a handle 82 thereon. This handle shaft projects inwardly into the bore 79 and has an eccentric pin 84 on its inner end that engages with the collar 80. By this means, rotation of the handle 82 will cause reciprocation of the valve stem 68.

The valve stem 68 has a small plate 86 welded or otherwise secured to its bottom surface. This plate has opposite paired extensions 87 projecting outwardly to each side of the valve stem. These paired projections 87 are spaced and receive between them the prongs 89 of the forked end of a link or lever 90, desirably with some lost motion. This link is of twisted shape and is pivoted to a rock shaft 91 that is cradled in opposite notches 92 in a sleeve-like supporting member 93 that is permanently secured to the interior of the pipe 45. The lower ends of the lever 90 are likewise forked and hooked over, as at 94, to engage on opposite sides of the collar 42 with lost motion. Thus, it will be seen that manual movement of the handle 82 not only shifts the main control valve 67 between the valve seats 61 and 65, but, with the lost motion, likewise shifts the valve 35 toward and from the seats 32 and 28.

In assembling the valve mechanism, the opening 52 in the top of the pipe 50 makes the linkage accessible. This opening is ultimately closed by a cover 96 that is soldered or welded at 97.

As previously indicated, the inlet 16 opens into the housing 25 at the back thereof in Fig. 2. The work line 17 is connected into the pipe 63. The work line 19 is connected from the pipe 27. The pipe 31 has its end plugged, as shown at 99. The return line 21 is connected into the housing 60, at the back in Fig. 2.

A modified form of the valve is shown in Fig. 5. Its operation is the same as that shown in the previous drawings. It has certain constructional advantages, as will appear from its full description. In it, the compressor discharge line 16 is shown, along with the compressor suction line 21, and the two work lines 17 and 19 all as previously described. The compressor discharge line 16 leads into a cup-shaped housing 100. This housing has a shoulder 101 formed on its inner surface, and against this shoulder a partition 102 is located. A combination spacer and port cylinder 103 engages onto the partition 102 and is stabilized by a cylindrical flange in the partition 102 around the top part of a passage 104 therethrough. This passage 104 terminates in a valve seat 105. The upper part of the cylinder 103 is held by a screw cap closure 106 threaded into the top of the cup 100 and sealed therein. The outlet work line 19 leads from the cup 100 and communicates through the ports 107 in the cylinder 103.

The cup 100 has inturned flanges on one end that receive a connecting pipe 110 that has a valve seat 111 on its inner end, this valve seat being spaced from and opposite to the valve seat 105. The pipe 110 receives the work line 17 entering thereinto. The other end of the pipe 110 fits into a cup 112 that may be identical with the cup 100. The pipe 110 has a valve seat 113 within the cup 112. The cup 112 receives a partition 114 corresponding to the partition 102 and having a port 115 therethrough terminating in a valve seat 116. A cylinder 117 having ports 118 engages the partition and is held by a cap 119. A pipe 120 connected with the work line 19 communicates through the ports 118 to the valve seat 116.

The cap 119, different from the cap 106, also closes the end of the cup 112. This cap has a closure 123 to which one end of a bellows 124 is attached in a manner similar to the attachment of the bellows 73 to the closure 74. The head of the bellows is secured to a valve stem 125, also in the same way as in the previous type.

The valve stem extends inwardly and is supported by a spacer 126, like those previously described, and has a valve head 127 supported on it between the two valve seats 113 and 116. The valve head 127 is secured in position by a threaded collar 128 that engages threads on the end of the stem 125. This threaded collar has a slot 129 in its upper end. This slot receives a pin 130 secured into the end of an extension valve stem 131. By this means, the valve stem 131 is caused to follow the movements of the valve stem 125, but with a lost motion. The valve stem extension 131 has a valve head 133 thereon for cooperation with the valve seats 111 and 105.

The valve may be manually operated. To this end, there is a cap 135 that threads onto the end of the closure plug 122 and may be secured by setscrews 136. Within it slides a collar 137 fixed to the stem 125, and this collar may be actuated by a handle in the same manner that the collar 80 of the previous modification is operated.

Operation

Fig. 4, the schematic diagram of this valve in an assembly, indicates two coils 12 and 13, either of which may be used as a condenser at one time and an evaporator at another time. These two coils are joined through the thermal valve 14, which is here shown as one having an external equalizer 24 connected to the suction line of the compressor.

At the start, the handle 82 will be turned to dispose the main valve 67 against either the valve seat 61 or the valve seat 65. Fig. 4 shows this valve 67 engaged firmly with the valve seat 65.

The connection between the valve stem 68 and the valve stem 36 made through the link 90 causes the lower valve 35 to move oppositely to the movement of the valve 67. The linkage is such as to assure that the inlet valve 35 will break from its seat upon shifting of the main control valve 67 from one seat to the other, and further to insure that the inlet valve 35 will be shifted far enough toward its other seat as to become subjected to differential pressure conditions that will complete its seating on the other seat, under the operating conditions to be described.

When the compressor 10 is started, by means not here shown, it will force gas under pressure through the inlet line 16 to the interior of the housing 25, where its further flow will be under regulation of the valve 35. With the valve 67 against the seat 65, the valve 35 will be away from the seat 32 and toward the seat 28. The lost motion through the link 90 does not produce actual seating of the valve 35. This is a great mechanical and structural advantage because the seating of two valves simultaneously offers constructional problems, owing to the accuracy of the mechanisms required to assure complete and simultaneous seating of both valves. This situation is aggravated where each of the two valves in question is required to seat on either of two seats.

If it be assumed that the valve 35 is at least as far toward the seat 28 as the midway point (and, under normal constructional conditions, it will actually be beyond the midpoint toward the seat 28), and the compressor is started, gas under pressure will be delivered to the valve 35. It will be ported by this valve past the seat 32 and into the pipe 31, thence by way of the pipe 66 to the upper pipe 63. Its egress from this pipe to the left is prevented by the seating of the main control valve 67 in the seat 65. Hence, any egress from the pipe 63 must take place around through the line 17, the coil 12, and the line 18 up to the thermal valve. In the meanwhile, if the valve 35 is not quite seated upon the seat 28, the compressor will deliver gas past the valve seat 28 and thence, by a short circuit by way of the pipe 27, the cross pipe 45, the upper pipe 50, past the valve seat 61, and into the line 21, whence it may return to the compressor.

Owing to the fact that this is a short-circuited flow, and also owing to the fact that the valve 35 is normally disposed fairly close to the seat 28, there will be a considerable pressure drop across the valve seat 28. The lost motion connection insures disposition of the valve 35 close enough to the seat 28 to produce this pressure drop and the attendant pressure differential on opposite sides of the valve head, that urges it toward the seat 28. It will be understood that the short-circuit flow is potentially considerably greater than the normal flow against the resistance of the coils 12 and the remainder of their associated system. Consequently, the pressure drop across the valve seat 28 will be great. The result of such pressure differential will be to cause the valve 35 to seat firmly on the seat 28, breaking the short circuit and forcing the high pressure gas to pass around the valve seat 32 and through the system, beginning with the coil 12. It will further be evident that, when the valve 35 does seat, the full compressor pressure will be exerted on the valve 35 to hold it against its seat 28, opposed only by return line pressure.

The high pressure gas passing through the coil 12 is condensed, owing to the fact that this coil is under the designated direction of gas flow acting as a condenser. The condensed fluid passes through the line 18 to the thermal valve.

Beyond the thermal valve, the compressor will be pulling a low pressure onto the pipe 20, the coil 13, the pipe 19, the system through the valve by way of the pipe 27, the pipe 45, the upper pipe 50, the valve seat 61, and the line 21. The low pressure condition will aid the opening of the thermal valve 14.

The thermal valve acts as an expansion valve and delivers refrigerant to the line 20 and to the coil 13, which acts in this case as an evaporator. The coil 13 thus draws heat from the surrounding fluid medium. The refrigerant is then successively drawn as aforesaid through the main control valve, and by the line 21 back to the compressor. There is thus established a refrigeration cycle wherein heat is withdrawn from the medium surrounding the coil 13 and is delivered up to the medium surrounding the coil 12. It will be assumed that the coil 12 is outside the building or space being conditioned; and the coil 13 is inside. This means then that the space is being cooled.

If the handle 82 is operated to throw the valve 67 to the left, away from the valve seat 65 and against the valve seat 61, the cycle will be reversed. Such movement of the valve 67 will, through the connection of the link 90 between the two valve stems 68 and 36, cause the valve 35 to be broken away from its seat 28 and to move toward the seat 32. As aforesaid, the normal construction of the valve will dispose the valve 35 beyond the mid-point toward the seat 32. Thereafter, when the compressor 10 is started, the operation previously described will repeat itself, with, however, the valve 35 seating itself tightly against the seat 32, and the direction of flow proceeding oppositely so that the flow passes the valve seat 28, thence into the line 19, and through the coil 13, which now acts as a condenser. The flow will pass from the coil 13 through the line 20 to the thermal valve, whereat it will be expanded and pass into the line 18 to the coil 12, which now acts as an evaporator. From this evaporator coil 12, the refrigerant flows through the line 17 back into the valve at the pipe 63, whence it may flow past the valve seat 65 and back into the return line 21 to the compressor. Under these conditions, the coil 13 will be delivering heat to the surrounding medium and the coil 12 extracting heat from the surrounding medium. Thus, the coil 13 will actually be acting as a heater for the space, rather than a cooler for the space.

The foregoing operation represents the conditions that may be obtained with this system. It was assumed that the change-over by the handle 82 was made when the compressor was dormant and the pressure conditions were neutralized throughout the system.

However, the handle 82 may be operated when the compressor is running. If it be assumed that the valve 67 is against the seat 65 and the valve 35 against the seat 28, as shown in Fig. 4, the coil 12 will be the condenser and the coil 13 the evaporator. As already described, there will be hot gas delivered through the control valve past the seat 32 and up to the coil 12. There will likewise be an expanded refrigerant in the coil 13, as well as in the two pipes 20 and 19, and the control valve in the pipe 27 up to the valve 35, the vertical pipe 45 and the upper pipe 50. If the valve 67 is suddenly shifted during such conditions to the valve seat 61, the valve 35 must be moved. If this valve 35 is not moved, then the two valves will be seated to the left simultaneously and the lower valve 35 will be subjected on its inlet side to the hot gas pressure and on its left side to the lower expanding refrigerant pressure. Ultimately, by virtue of leakages and the like, these two pressures may equalize. It will be noted that when the compressor is stopped the external equalizer line delivers return line pressure, now equal to evaporator pressure, beneath the conventional diaphragm on the thermal valve, so that this valve is normally closed, thus blocking the equalizing of pressures across the thermal valve, so that equalization must take place by leakage past the two valves 67 and 35.

In the copending application previously mentioned, this situation is avoided by the use of a particular thermal valve having check valves associated therewith to facilitate the equalization of pressures across the thermal valve, despite the fact that it may otherwise tend to close. The present system avoids the necessity of such specialized thermal valve because the shifting of the valve 67 from one seat to the other is accompanied by a mechanical breaking away of the valve 35 from whichever seat it was engaging. Thus, if the valve 67 is moved from the valve seat 65, as shown in Fig. 4, to the valve seat 61, the link 90, acting between the two valve stems, will break the valve 35 away from the seat 28, despite the fact that the compressor pressure, acting to the right of this valve 35, may, at such time, be considerably greater than the evaporator pressure acting to the left of this valve. Equalization then rapidly occurs, followed by reversal of the flow.

It will be seen that the connection afforded by the link 90 between the two valve stems need not be highly accurate, because it is necessary only to break the valve 35 away and permit it to move at least far enough toward the opposite seat to produce the pressure drop that will complete the seating. The mechanical movement of the valve 35, afforded by the construction shown, will positively move the valve 35 at least as far as this mid-point and will permit it to move all the way from the mid-point to the proper valve seat.

In other words, a valve construction has been shown wherein equalizing may be readily and quickly obtained when the main control valve is shifted manually, even though the shifting takes place while the compressor is in operation. Also, the arrangement permits the inlet valve 35 to open at rest conditions of the compressor, as where high evaporator pressures develop. When this occurs, the compressor can start under short-circuited conditions, and come up to an operating speed before the valve 35 recloses and puts the full load on it.

The connections of the valve shown in Fig. 5 are as indicated thereon, and they are made with the assembly diagrammatically illustrated in Fig. 4. With the valves in the position shown in Fig. 5, the flow will be in the same direction as it is in Fig. 4. When the stem 125 is shifted leftwardly manually, the valve 127 will be shifted from the seat 113 to the seat 116. The valve 133 will be positively broken from its valve seat 105. The engagement of the pin 130 at the right end of the slot 129 will cause the valve 133 to be positively broken away from the valve seat 105 and moved over toward the valve seat 111. Thereafter, the flow pattern previously described in connection with Fig. 4 will cause the valve 133 to move into engagement with the valve seat 111. In other words, the modification of Fig. 5 preserves the operative characteristics of Fig. 4, including the lost motion, but it does so with certain structural and manufacturing advantages. It reduces the number of brazed joints and eliminates an alignment problem that is present in the two discs 30 and 62 of Fig. 2, which are permanently attached together. It contains fewer separable parts, and also requires less space. It may be conveniently serviced by the removal of the end plugs 106 and 122. When they are removed, the elements may be withdrawn. First, the parts down to the partition 102 are withdrawn, whereupon the valve head 133 can be removed. Thereafter, the elements down to the partition 114 may be withdrawn, and with them the valve 127 up through the valve stem extension 131.

What is claimed is:

1. In a valve mechanism, a housing, a high pressure inlet therein, a low pressure outlet, a first work outlet, a second work outlet, a main control valve movable to selectively connect one of the work outlets with the low pressure outlet and to cut off the other from the low pressure outlet, a second valve, a pair of spaced valve seats therefor, said second valve being movable between the said valve seats to connect one of the work outlets with the inlet and to cut off the other work outlet from the inlet, means to move said main valve, and lost-motion connections between the said moving means and the second valve, to cause said second valve to move when the main valve is moved.

2. In a valve mechanism, a housing, a high pressure inlet therein, a low pressure outlet, a first work outlet, a second work outlet, a main control valve movable to selectively connect one of the work outlets with the low pressure outlet outlet, and vice versa, a second valve, a pair of spaced valve seats therefor, said second valve being movable between the said valve seats to connect one of the work outlets with the inlet and to cut off the other work outlet from the inlet, means to move said main valve, and lost-motion connections between the said moving means and the second valve, to cause said second valve to move when the main valve is moved, said lost-motion connections being constructed to insure breaking of the said second valve from the seat with which it is engaged when said main valve is moved to change the connections of the work lines and the low pressure outlet.

3. In a valve mechanism, a housing, a high pressure inlet therein, a low pressure outlet, a first work outlet, a second work outlet, a main control valve movable to selectively connect one of the work outlets with the low pressure outlet and to cut off the other from the low pressure outlet, and vice versa, a second valve, a pair of spaced valve seats therefor, said second valve being movable between the said valve seats to connect one of the work outlets with the inlet and to cut off the other work outlet from the inlet, means to move said main valve, and lost-motion connections between the said moving means and the second valve to cause said second valve to move when the main valve is moved, said lost-motion connection being constructed to effect displacement of the said second valve from its seat and to move the same into flow constricting relationship with the second valve seat when the moving means shifts the main valve.

4. In a valve mechanism, a housing, a high pressure inlet therein, a low pressure outlet, a first work outlet, a second work outlet, a main control valve movable to selectively connect one of the work outlets with the low pressure outlet and to cut off the other from the low pressure outlet, and vice versa, a second valve, a pair of spaced valve seats therefor, said second valve being movable between the said valve seats to connect one of the work outlets with the inlet and to cut off the other work outlet from the inlet, means to move said main valve, lost-motion connections between the said moving means and the second valve to cause said second valve to move when the main valve is moved, said connections comprising a link means, a valve stem for the main valve, a valve stem for the second valve, and lost-motion connections between the link means and at least one of said valve stems.

5. In a valve mechanism, a housing, a high pressure inlet therein, a low pressure outlet, a first work outlet, a second work outlet, a main control valve movable to selectively connect one of the work outlets with the low pressure outlet and to cut off the other from the low pressure outlet, a second valve, a pair of spaced valve seats therefor, said second valve being movable between the said valve seats to connect one of the work outlets with the inlet and to cut off the other work outlet from the inlet, means to move said main valve, and lost-motion connections between the said moving means and the second valve to cause said second valve to move when the main valve is moved, said lost-motion connections being constructed to cause the said second valve to move at least half way from one of its positions to the other upon movement of said main valve from one of its positions to the other.

6. In a valve construction, a first valve housing having inlet means and outlet means and a valve controlling flow therebetween, a tubular member connected with the housing, a valve operating member in the tubular member and movable therein, a second valve housing having inlet means and outlet means and a second valve controlling flow therebetween, a second tubular member connected to the second housing, a second valve operating member in the second tubular member, a tubular connecting element connected between said tubular members, a link disposed in the connecting element, means pivotally mounting the link in the element, means connecting the link with the valve stems with a lost motion, and means for positively operating one of said valves whereby movement of the other valve is effected through resulting movement of the lost motion linkage independently of said positive operating means.

7. In a valve construction, a first valve housing having inlet means and outlet means and a valve controlling flow therebetween, a tubular member connected with the housing, a valve operating member in the tubular member and movable therein, a second valve housing having inlet means and outlet means and a second valve controlling flow therebetween, a second tubular member connected to the second housing, a second valve operating member in the second tubular member, a tubular connecting element connected between said tubular members, and a link disposed in the connecting element, means pivotally mounting the link in the element, the link projecting at one end to one valve stem and at the other end to the other valve stem, abutment means on each valve stem to transmit movements between the stem and the link, at least one abutment means including a pair of abutments spaced along the valve stem for engagement with the link, and spaced along the link a greater distance apart than the corresponding dimension of the link, to provide a lost-motion connection.

8. A reverse cycle refrigeration valve for use with a compressor, a high pressure line, a return line, a pair of coils, a thermal expansion valve, the coils being oppositely connected with the thermal valve, and a pair of work lines one leading to each coil, comprising the combination of a valve housing having a first valve chamber, an inlet into said chamber for connection with the high pressure line, opposed outlets leading from said chamber, having opposed valve seats, each outlet being adapted for connection with a work line, a second valve housing having a second valve chamber with an outlet for connection with the return line, the chamber having opposed inlets and opposed valve seats, each inlet being connected with an outlet from the first valve chamber, the first valve being selectively movable to each valve seat in said chamber, a second valve in the second valve chamber and selectively movable to each valve seat therein, means to move the second valve from one seat to the other to connect one of the inlets of the second chamber to the return line and to cut off the other from the return line, and connections between the two valves to cause the first valve simultaneously to move toward position to open the inlet of the second chamber cut off by the second valve responsive to said second valve moving means, to the high pressure inlet and to cut off the inlet of the second chamber opened by the second valve, from the high pressure inlet.

9. A reverse cycle refrigeration valve for use with a compressor, a high pressure line, a return line, a pair of coils, a thermal expansion valve, the coils being oppositely connected with the thermal valve, and a pair of work lines one leading to each coil, comprising the combination of a valve housing having a first valve chamber, an inlet into said chamber for connection with the high pressure line, opposed outlets leading from said chamber, having opposed valve seats, each outlet being adapted for connection with a work line, a second valve housing having a second valve chamber with an outlet for connection with the return line, the chamber having opposed inlets and opposed valve seats, each inlet being connected with an outlet from the first valve chamber, a first valve in the first valve chamber, the first valve being selectively movable to each valve seat in said chamber, a second valve in the second valve chamber and selectively movable to each valve seat therein, means to move the second valve from one seat to the other to connect one of the inlets of the second chamber to the return line and to cut the other off from the return line, and connections between the two valves to cause the first valve simultaneously to move toward position to open the inlet of the second chamber cut off by the second valve responsive to said second valve moving means, to the high pressure inlet and to cut off the inlet of the second chamber opened by the second valve, from the high pressure inlet, said connections including a lost-motion device.

10. A valve construction including a first valve mechanism having a first valve housing, a removable closure thereon, a first tubular element extending into the housing opposite the closure and having a first valve seat at the end thereof, a second tubular element secured to the closure, projecting into the housing and having a second valve seat at its end, disposed in opposition to the first valve seat, a second valve mechanism of like construction, means connecting the corresponding tubular elements of the two mechanisms, a first valve in the first housing movable between the two seats, a stem therefor projecting into one tubular element, a second valve in the second housing movable between its two seats, a second stem therefor projecting into the tubular element, corresponding to the first stem, linkage means in a connecting means between the two tubular elements, said linkage means joining the two stems for conjoint movement of the two valves, and handle means connected with one tubular element for moving one valve stem.

11. A valve mechanism, comprising a housing having a high pressure inlet, a low pressure outlet, a first work outlet, and a second work outlet; a first control valve movable between a first set of valve seats to selectively connect one of the work outlets with the low pressure outlet; a second valve movable between a second set of valve seats to selectively connect one of the work outlets with the inlet; means to move said first valve from one valve seat to the other; and means interconnecting the valves to move the second valve from one valve seat toward the other valve seat but not into closure therewith when said one valve is moved from one seat to the other, said interconnecting means including means permitting limited movement of said second valve relative thereto so as to permit it to move to closure with said second valve seat due to the difference in pressure caused by the flow of fluid through the valve mechanism.

EDWARD F. KOUNOVSKY.

References Cited in the file of this patent

UNITED STATES PATENTS

| Number | Name | Date |
|---|---|---|
| 307,516 | Anson | Nov. 4, 1884 |
| 588,458 | Matton | Aug. 17, 1897 |
| 658,797 | Moeres | Oct. 2, 1900 |
| 728,611 | Potter | May 19, 1903 |
| 765,867 | Watter | July 26, 1904 |
| 2,019,193 | Mueller | Oct. 29, 1935 |
| 2,240,163 | Pick | Apr. 29, 1941 |
| 2,280,518 | Ball | Apr. 21, 1942 |
| 2,505,710 | Hayden | Apr. 25, 1950 |

FOREIGN PATENTS

| Number | Country | Date |
|---|---|---|
| 31,575 | Holland | of 1933 |